United States Patent [19]

Donnelly

[11] Patent Number: 4,982,788
[45] Date of Patent: Jan. 8, 1991

[54] APPARATUS AND METHOD FOR REMOVING VOLATILE CONTAMINANTS FROM THE GROUND

[76] Inventor: Lawrence A. Donnelly, 1062 Washington Dr., Centerport, N.Y. 11721

[21] Appl. No.: 321,936

[22] Filed: Mar. 10, 1989

[51] Int. Cl.$^5$ .................... E21B 43/24; E21B 43/40; E21B 23/00; E02D 3/11

[52] U.S. Cl. ........................... 166/266; 166/57; 166/267; 166/272; 166/370; 166/381; 405/131; 405/258

[58] Field of Search ............ 166/252, 266–269, 166/272, 364, 370, 75.1, 381, 57; 405/128, 131, 258

[56] References Cited

U.S. PATENT DOCUMENTS

| | | | |
|---|---|---|---|
| 2,107,006 | 2/1938 | Lang | 166/269 |
| 2,461,449 | 2/1949 | Smith et al. | 166/57 |
| 2,617,484 | 11/1952 | Swearingen | 166/57 |
| 3,430,701 | 3/1969 | Canada | 166/269 |
| 3,824,767 | 7/1974 | Ford | 55/80 |
| 4,167,973 | 9/1979 | Forte et al. | 166/267 |
| 4,303,127 | 12/1981 | Freel et al. | 166/267 |
| 4,323,122 | 4/1982 | Knopik | 166/369 |
| 4,593,760 | 6/1986 | Visser et al. | 166/267 |
| 4,660,639 | 4/1987 | Visser et al. | 166/370 |
| 4,730,672 | 3/1988 | Payne | 166/267 |
| 4,832,122 | 5/1989 | Corey et al. | 166/266 |
| 4,842,448 | 6/1989 | Koerner et al. | 405/131 |

Primary Examiner—Bruce M. Kisliuk
Attorney, Agent, or Firm—David Aker

[57] ABSTRACT

Hazardous volatile contaminants are removed from the ground by circulating air between two substantially parallel wells and by removing the vapors of the organic compound from the circulated air using at least one of a condenser and a demister. To enhance efficiency the air is recirculated in a closed loop. The heat output of the condensation process is used to heat the recirculated air. Pipes having openings along only a limited portion of their lengths are placed in the wells and the depth of the openings adjusted to treat one level at a time, thereby preventing shunting of air through more porous soil layers. Flow rates can be equalized by using circumferentially placed induction wells surrounding an extraction well (or the reverse) and by controlling air flow through individual sections of a given level.

34 Claims, 1 Drawing Sheet

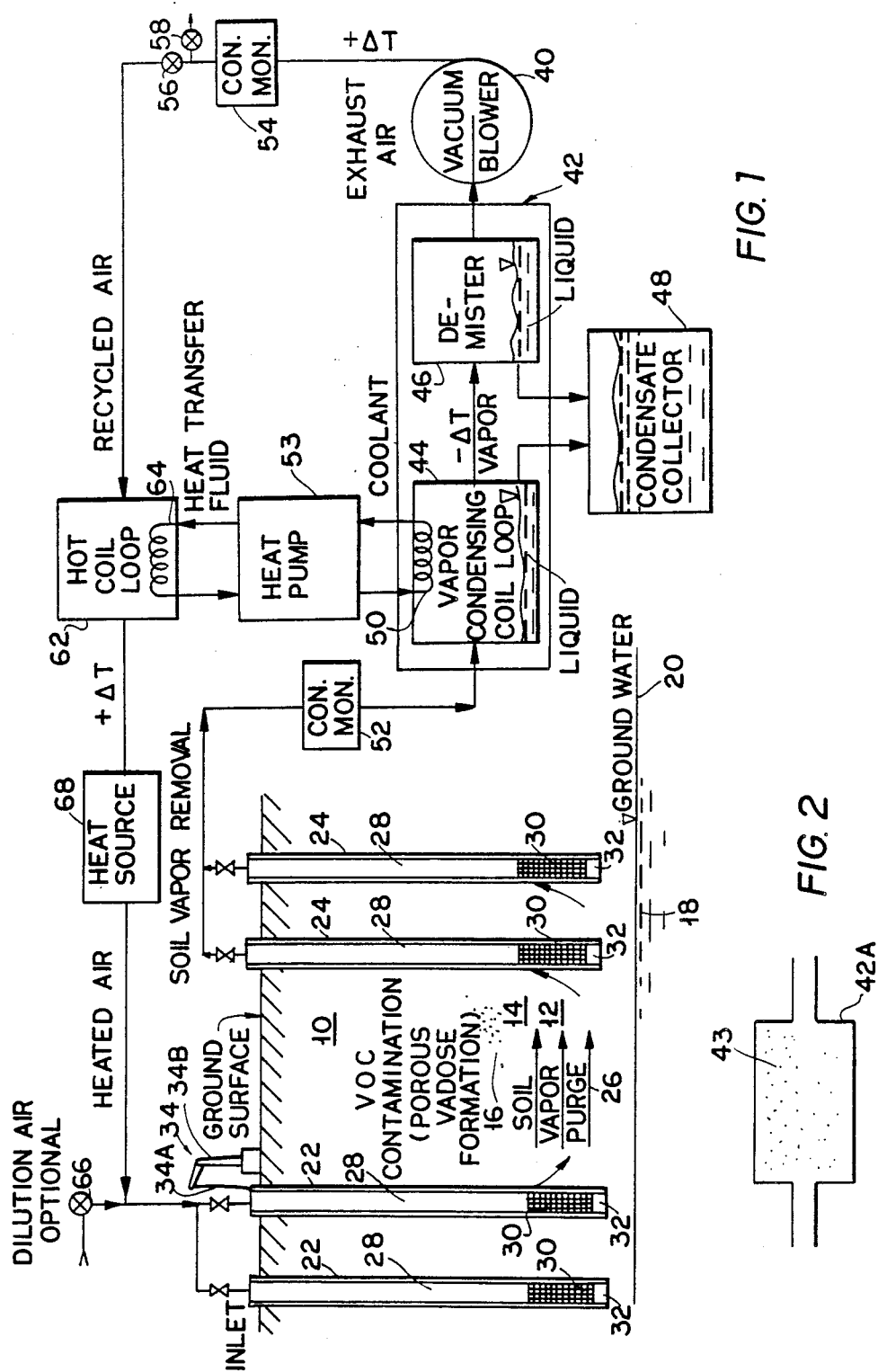

APPARATUS AND METHOD FOR REMOVING VOLATILE CONTAMINANTS FROM THE GROUND

TECHNICAL FIELD

This invention relates to environmental remediation technology. More particularly, this invention relates to an apparatus and a method for removing volatile organic compounds from the ground. More specifically, it relates to an apparatus and method using vacuum technology for removing volatile organic compounds.

BACKGROUND ART

In industrialized societies it has become commonplace for spills of hazardous materials to occur. Sometimes these spills occur at sea due to, for example, a leak in an oil tanker. Various technologies have been developed to deal with this situation.

More often, spills occur on land or even underneath the ground. For example, underground gasoline tanks may leak or solvents used in industrial processes may be illegally discharged into waste water or sumps or directly onto the ground. In any case, the hazardous material, typically a volatile organic compound, may propogate great distances through the ground and even enter ground water aquifers. The resulting environmental impact may be devastating.

Various vacuum techniques have been applied to the problem of extracting these volatile hazardous materials from the ground. In a first, primitive technique, a rather long and deep ditch is dug in the ground where contamination has occurred. A pipe with a multitude of small, screened openings is then placed horizontally at the bottom of the ditch. This pipe is then connected to a vertical pipe which extends along a wall of the ditch to the surface. A vacuum blower located on the surface completes this extraction site.

To use this method, it is necessary to dig up the soil at the spill site that has been contaminated. The contaminated soil is then transported to the extraction site where it is used to fill in the ditch. A vacuum is then pulled on the vertically-extending pipe using the vacuum blower. Eventually, assuming the hazardous material is at all volatile, it is removed from the soil. The soil is then removed from the ditch and used as land fill at either the original spill site or a new location.

This technique suffers from several major disadvantages. First, it is necessary to disrupt the spill site and remove the soil, at least on a temporary basis. Further, it is exceedingly expensive to cart the material to the extraction site and back to the spill site or another landfill site. Finally, as more specifically outlined below, there are some environmental objections to this method of removal which, if it is to be useful, require an extremely low hazardous material removal rate.

Another approach used to remove such hazardous materials from the ground does not require that the soil be removed and transported. Instead, a shallow vertical well is drilled. Another shallow vertical well is then drilled a short distance from and substantially parallel to the first well. A vacuum blower pulls air from the first well while air is permitted to enter the second well. Each well may have in it a snugly fitting pipe having numerous, preferably screened, openings therein along its entire length in a manner similar to the pipe used in the first technique described above.

While this technique is more economically efficient because the transportation of soil is unnecessary, it also suffers from several major disadvantages. First, since there are openings along the entire length of the pipe, the vacuum is drawn on areas of the soil which are permeable to air and on areas that are relatively impermeable. The permeable areas tend to act as shunt passages through which large quantities of air are drawn, thus detracting from the amount of air drawn through less permeable areas. However, volumes of soil which are less permeable to air may nevertheless be heavily impregnated with the hazardous solvents. These areas are not purged of hazardous material. The hazardous material thus remains in the ground and continues to be a potential source of an environmental disaster. Another major disadvantage of this technique is that only a limited volume of ground soil is treated. While this disadvantage may be overcome by forming, in addition to the primary well, a plurality of secondary wells surrounding the primary well (preferably in a circle), this produces another significant problem.

When hazardous materials are removed from the ground by this technique, air containing the vapors of the organic solvents is discharged into the atmosphere. There are federal, state and local environmental regulations which place a limit on the amount of solvent that may be discharged in this manner. For example, a typical limit is 3.5 pounds (1.6 kilograms) per hour for volatile organic compounds. If a deep well is drilled, it is not uncommon for one well alone to produce 2.5 pounds of solvent per hour discharged into the air. Thus, it is impossible to uncap several of the secondary wells simultaneously to increase the speed at which the solvent is removed from the ground because permissible environmental ambient air quality limitations would be exceeded. In the case of a large spill, it could take years to effect a proper clean up.

There are techniques which allow for increasing the speed of the clean up. The most common approach is to use an activated charcoal filter to adsorb the vapors of the hazardous material. While placing such a filter in the atmospheric discharge conduit of the vacuum blower is a relatively simple procedure, the cost is quite large. The filter has only a finite life, after which it must be taken to a processing plant to be stripped of the hazardous material. Unless a replacement filter is immediately available, this disrupts the purging process. Further, with the use of spare filters, there is a practical financial limit to the speed at which the ground can be purged. In the limit, this is due to the cost of reactivating the adsorbent (e.g. charcoal) for reuse.

DISCLOSURE OF THE INVENTION

It is a principal object of the present invention to provide a method and apparatus for the efficient and rapid removal of hazardous materials from the ground.

It is another object of the invention to provide an apparatus and method for removing organic compounds from the ground rapidly and efficiently without excessive contaminant discharge to the atmosphere.

It is yet another object of the invention to provide an apparatus and method for removing such compounds from the ground at reasonable cost.

It is still another object of the invention to direct purge air to the most contaminated soil, regardless of the permeability of that soil relative to the permeability of surrounding formations.

In accordance with the invention, an apparatus for removing volatile organic compounds from contaminated grounds includes a first well extending down into the ground; a second well proximate to the first well arranged substantially in parallel with the first well, air moving means for moving air and vapor of the volatile organic compound from the first well; and condensing means for condensing organic compound contained in the air from the first well. A collection means collects the organic compound condensed by the condensing means.

Preferably the condensing means includes a first conduit through which the air moved from the first well is conducted and cooling means for cooling air and vapor of the organic compound in the conduit. A demister collects condensed droplets of the organic compound in the air output from the condensing means.

Preferably a conduit conducts air moved from the first well to the second well so that air is recirculated from the first well through the air moving means and into the second well. The recirculated air may be heated by a supplemental heater to remove organic compounds that are not very volatile.

Preferably the condensing means includes a heat pump having a cold coil loop and a hot coil loop. The cold coil loop cools air moved from the first well while the hot coil loop heats air moving into the second well when the air moving means moves air from the first well.

The apparatus of the invention may also include at least one concentration monitoring means for monitoring the concentration of organic vapors in at least one of the air moved from the first well or air leaving the removing means.

The air moving means is preferably a vacuum blower having an input connected so as to draw air from the first well and an output which may be connected to force air into the second well.

In accordance with another feature of the apparatus and the method of the invention, at least one of the wells contains and a hollow pipe fitting therein and having a continuous wall without openings along a substantial portion of its length. An array of openings is provided along a limited portion of the length of the pipe. The invention further comprises at least one pipe moving means for moving the hollow pipe into and out of the at least one well so that the array of openings may be positioned at various depths along the well.

In accordance with the method of the invention, volatile organic compounds are removed from contaminated ground by moving air and vapor of the volatile organic compound from a first well extending into the contaminated ground while air enters a second well substantially parallel to the first well; and condensing vapors of the organic compound from the air moved from the first well. The air from which the organic compound is condensed is demisted.

Preferably, the method includes the further step of recirculating into the second well air from the first well from which a substantial portion of the organic compound has been removed. Preferably, air removed from the first well is cooled and air which enters the second well is heated. Heat removed from the air moved from the first well may be used to heat air which enters the second well.

BRIEF DESCRIPTION OF THE DRAWINGS

Further objects, features and advantages in the invention will become apparent upon consideration of the following detailed description in conjunction with the drawing in which:

FIG. 1 is a schematic diagram of an apparatus according to the invention which also utilizes the method according to the invention; and FIG. 2 is a schematic diagram of an alternative vapor removal apparatus for use with the system of FIG. 1.

DETAILED DISCLOSURE OF THE PREFERRED EMBODIMENTS

Referring to FIG. 1, a portion of the ground 10 having a relatively porous and permeable layer 12 and a relatively impervious layer 14 contaminated with a volatile organic compound shown generally as 16, is to be decontaminated. Volatile organic compound 16 may include such hydrocarbons as gasoline, light grades of kerosene, cleaning fluid or other volatile materials which can cause extremely adverse environmental consequences if the material diffuses either horizontally or vertically into the ground water 18 in an aquifer 20 or upwardly into an inhabited area. It is not unusual for relatively impermeable layer 14 to be heavily impregnated with a high concentration of the volatile organic compound 16.

An air inlet well 22 (or several air inlet wells 22) is drilled in the ground. A series of outlet wells 24 are drilled in proximity to well 22 and preferably substantially parallel to well 22. As an example, wells 24 may form a circle around inlet well 22. Alternatively, wells 22 may form a circle around a well or wells 24. Generally, air is drawn from at least one of wells 24 by a suitable air moving means such as the suction end of a vacuum blower. If this is the case, air is drawn from the atmosphere into inlet well 22. Alternatively, air may be forced into inlet well 22 and will thus be discharged from wells 24. When a well 24 is not being used to remove contaminants from the soil, it is capped in an airtight fashion.

The flow of air between inlet well 22 and at least one of outlet wells 24 is represented at 26. This flow tends to purge the volatile organic compound and water vapor from the permeable ground formation.

In accordance with a feature of the invention, well 22 and each well 24 have disposed therein a pipe 28 having an outer diameter which tightly fits the diameter of the well. By tight, it is meant that when air is drawn from a pipe 28, it is drawn from the surrounding formation through openings in the pipe (screen 28), and not from a space between the pipe and the wall of the well, which is sealed in a manner well known in the art. Each pipe 28 is closed along almost its entire length except for a portion 30 adjacent its end 32 which has a series of openings therein. Portion 30 may be formed, for example, as a screen in a manner well known in the art. The end 32 of each pipe 28 is closed off against air leakage.

Each well may have a depth of, for example, 95 feet (29 meters). The wells are drilled so that they extend to a depth just short of ground water. When purging is carried out, it is first performed with the pipes 28 lowered into respective wells 22 and 24 to a first, lowest depth. Generally this is the preferred approach, as it tends to arrest further spread of the hazardous material by removing the advancing front. This first, lowest depth may be, for example, one at which relatively permeable soil layer 12 is located. After purging at a particular level has been completed, at a time which is determined in the manner more specifically described below, the pipes 28 are raised by a lifting mechanism 34 (such as a cable 34A attached to the pipe and pulled upward by a crane 34B), so that the open portions 30 of pipes 28 are at a level above the level shown in FIG. 1. For example, portions 30 may be at the level of the relatively impermeable soil layer 14. The ground is then purged for whatever period of time it takes to remove most of the volatile organic compound from the impermeable soil layer 14. It will be understood that if the pipes 28 were open along a substantial portion of their length, or at their bottoms, air flowing through the relatively permeable layer 12 of the soil would create a shunt around the relatively impermeable layer 14 and purging of the layer 14 would not occur. The use of pipes 28 having an opening only along a portion of their length avoids this difficulty.

The use of at least two pipes having openings along only a limited portion of their lengths is preferred. However some control over the region purged can be obtained if only one pipe is so configured (and the depth of the openings changed as described above), and another adjacent well has disposed therein a second pipe having openings along its entire length. Alternatively, for the other well, an airtight seal may be made to the well at the top without any substantial length of pipe therein.

In accordance with the invention, appropriate interconnecting tubing is provided so that a vacuum blower 40 draws air and vapors of the organic compound through a vapor removal apparatus 42 which preferably includes a vapor condenser 44 and a demister 46. The liquid condensate from condenser 44 and demister 46 are drained or pumped through appropriate conduits to a condensate collector tank 48.

Condenser 44 includes a cooling coil 50 which is preferably the evaporator coil of a heat pump 53 or other suitable refrigeration unit which may exhaust the heat removed from the air and vapor mixture in condenser 44. The liquid formed from the vapors condensed in condenser 44 typically contains water as well as the organic compound being purged from the ground 10. It may also contain droplets of the organic compound as well as water vapor droplets. The output of condenser 44 is thus routed into a demister 46 so that these droplets, and in particular the droplets of the organic compound, are also removed to finally appear in condensate collector tank 48.

While the material in condensate collector tank 48 may be disposed of in any environmentally safe and legal fashion, it will be recognized by those skilled in the art that it may be possible to recycle the material. For example, if the organic compound removed from the ground 10 and water are not miscible, two distinct layers will form in condensate collector tank 48 It will thus be possible to easily mechanically separate the liquid of the volatile organic compound from the water which is collected. The organic compound can then be sold or recycled for its intended purpose rather than simply being discarded.

In order to determine when a region of the ground has been sufficiently purged, concentration monitors 52 and 54 are provided. Monitor 52 is disposed in the tube leading to condenser 44. When the concentration of volatile organic material in the gas stream (from one or more pipes 24) drops below a predetermined level, it can be inferred that the of the ground being purged is relatively uncontaminated and purging can be discontinued. Monitor 54 is used for a different purpose. In a simple system, according to the invention, the output of vacuum blower 40 may be exhausted to the atmosphere. Alternatively, the system of FIG. 1 may be operated with a valve 56 closed and a valve 58 opened. In either case, monitor 54 provides an indication of the concentration of the organic compound in the gas being discharged into the atmosphere. It will be understood that the gas leaving at this point may be sampled, and taken to a laboratory to confirm that concentration monitor 54 is operating properly.

Merely using condenser 44 and demister 46 will significantly reduce the amount of volatile organic compound present in the vapors that are discharged into the atmosphere. This may be sufficient for many applications. However, in accordance with the invention, it is desirable that a closed loop system be operated in order to further reduce and/or eliminate the concentration of hazardous vapors in any air that is discharged and to enhance the speed with which the hazardous material is removed from the ground.

In accordance with the invention, if valve 58 is closed and valve 56 is opened, gas from the exhaust side of vacuum blower 40 is recycled into inlet well 22. Thus, the system of the FIG. 1 may operate as a closed loop with the purging being enhanced by the fact that the gases exhausted from vacuum blower 40 typically have a higher than gas inlet temperature due to the normal compression of the air stream by vacuum blower 40. More specifically, the exhaust gases from vacuum blower 40 may be routed through a heat exchanger 62 so that the gases are heated by the hot coil loop 64 of heat pump 53. Thus, the heat which is removed from the gases drawn from wells 24 is used to heat the air before it is injected into inlet well 22. As noted above, this materially enhances the rate with which hazardous material is removed from the ground 10 without compromising ambient air quality.

A supplemental heat source 68 may be used to provide additional heat to the air recirculated into well or wells 22. This is especially useful when the organic compound is not extremely volatile, i.e. has a relatively low vapor pressure. If a supplemental heater is used, enough vapor may be generated to detrimentally increase the inlet pressure of vacuum blower 40. This pressure may be monitored, and if the increase is too great, a larger capacity vacuum blower should be used.

Under certain circumstances it may be desirable to add ambient air to the stream of gases being injected into inlet well 22. A valve 66 may be provided for this purpose. When valve 66 is opened, pressurized ambient air may be injected into well 22.

Referring to FIG. 2, a canister 42A filled with activated charcoal 43 is used as a vapor removing means in the system of FIG. 1. While environmentally advantageous and effective in terms of removing organic compounds from the air moved from the wells, due to heating of the recirculated air, this embodiment is not as economically advantageous because of the additional expense associated with the filter.

Various modifications of the invention will occur to those skilled in the art. For example, instead of a vacuum blower 40, an air compressor may be used. If the exhaust of the air compressor is recycled into well 22, similar advantageous results will be obtained. In addition, instead of a heat pump 53 being used, any of several well known refrigeration units may be employed. The recycled gases from vacuum blower 40 (or an appropriate air compressor) are then heated by the rejected heat of the refrigeration unit.

Although the invention has been described with reference to particular embodiments, it is to be understood that these embodiments are merely illustrative of the application of the principles of the invention. Numerous modifications may be made in and other arrangements may be devised without departing from the spirit and scope of the invention.

I claim:

1. An apparatus for removing a volatile contaminant from portions of ground contaminated with said contaminant, comprising:

a first well extending down into the ground;

a second well in proximity to said first well and arranged substantially in parallel with said first well;

air removing means for removing air and vapor of said volatile contaminant from said first well; and condensing means for condensing contaminant contained in said air removed from said first well; wherein said condensing means includes a heat pump, said heat pump having a cold coil loop and a hot coil loop, said cold coil loop being for cooling air removed from said first well; and said hot coil loop being for heating air moved into said second well when said air removing means removes air from said first well.

2. The apparatus of claim 1, further comprising:

a conduit for conducting, to said second well, air removed from said first well by said air removing means, whereby air is recirculated from said first well, through said air removing means and into said second well.

3. A method for removing a volatile contaminant from portions of ground contaminated with said contaminant, comprising the steps of:

removing air and vapor of said volatile contaminant from a first well extending into said contaminated ground while air enters a second well substantially parallel to said first well;

condensing vapors of the contaminant from the air drawn from said first well, and heating air allowed into said second well with heat removed from air drawn from said first well.

4. The method of claim 3, further comprising the step of:

demisting said air from which said vapors of said volatile contaminants have been condensed.

5. The method of claim 3, further comprising the step of collecting the volatile contaminants removed from the air drawn from said first well.

6. The method of claim 3, further comprising the step of introducing additional ambient air into said second well.

7. The method of claim 3, further comprising the step of monitoring concentration of contaminant in at least one of air drawn from said first well and air from which at least some of said contaminants have been condensed.

8. The method of claim 3, wherein an input of a vacuum blower is connected so as to remove air from said first well.

9. The method of claim 8, wherein an output of said vacuum blower is connected so as to force air into said second well.

10. An apparatus for removing a volatile contaminant from portions of ground between a surface and ground water level, the ground being contaminated with said contaminant, comprising:

a first well extending down into the ground;

a second well in proximity to said first well and arranged substantially in parallel with said first well;

air removing means for removing air and vapor of said volatile contaminant from said first well;

contaminant removing means for removing contaminant contained in said air removed from said first well;

recirculating means for recirculating air removed from said first well to said second well; and heating means for heating air recirculated into said second well with heat taken from said air removed from said first well.

11. The apparatus of claim 10, wherein said removing means includes adsorbing means for adsorbing the vapor of the contaminant.

12. A method for removing a volatile contaminant from portions of ground contaminated with said contaminant and having drilled therein at least two substantially parallel wells extending downward into the ground, comprising the steps of:

(a) inserting into at least one of said wells a first pipe having an outer diameter such that it fits tightly into said at least one well, said pipe having a continuous wall without openings along a substantial portion of its length, a closed bottom, and an array of openings along a limited portion of its length;

(b) adjusting depth of the array of openings of said first pipe to a lowest level of said contaminant above ground water;

(c) circulating air between said first pipe and a second pipe to purge the ground of the volatile contaminant;

(d) adjusting depth of the array of openings to a second level above said lowest level; and repeating step (c).

13. The method of claim 12, comprising:

inserting into each of at least two of said wells one of said first pipes; and adjusting depth of said arrays of openings of said first pipes so that the depths are substantially equal.

14. The method of claim 13, further comprising:

(d) adjusting depth of said arrays opening to a second level, and repeating step (c).

15. The method of claim 12, further comprising the step of:

(e) drilling the wells prior to performing steps (a) through (c).

16. An apparatus for removing a volatile contaminant from portions of ground contaminated with said contaminant, comprising:

a first well extending down into the contaminated ground;

a second well in proximity to said first well and arranged substantially in parallel with said first well;

a conduit connecting said first well and said second well, said conduit having disposed along its length:

an air removing means for removing air and vapor of said contaminant from said first well and urging it toward said second well; and a condensing means for condensing volatile contaminant contained in said air removed from said first well; and a heat source for using heat from said air removed from said first well by said condensing means for heating air to be input into said second well.

17. The apparatus of claim 16, wherein said heat source is disposed along said conduit.

18. The apparatus of claim 17, wherein said heat source is between said air removing means and said second well.

19. An apparatus for removing a volatile contaminant from portions of ground contaminated with said contaminant, comprising:
  first coupling means for coupling said apparatus to a first well extending down into the contaminated ground;
  second coupling means for coupling said apparatus to a second well in proximity to said first well and arranged substantially in parallel with said first well;
  a conduit connecting said first well and said second well, said conduit having disposed along its length:
  an air removing means for removing air and vapor of said contaminant from said first well and urging it toward said second well; and
  a condensing means for condensing volatile contaminants contained in said air removed from said first well; and
  a heat source for using heat from said air removed from said first well by said condensing means for heating air to be input into said second well.

20. The apparatus of claim 16 or 19, further comprising a demister for receiving air output from said condensing means and for collecting droplets of said volatile contaminant in said air output.

21. The apparatus of claim 16 or 19, further comprising air mixing means for introducing ambient air into said second well.

22. The apparatus of claim 16 or 19, wherein said condensing means comprises:
  a heat pump, said heat pump having a cold coil loop and a hot coil loop, said cold coil loop being for cooling air removed from said first well; and said hot coil loop being for heating air moved into said second well when said air removing means removes air from said first well.

23. The apparatus of claim 16 or 19, further comprising, disposed in at least one of said first well and said second well:
  a hollow pipe fitting in a tight manner in said at least one well and having a continuous wall without openings along a substantial portion of its length; and an array of openings along a limited portion of its length.

24. The apparatus of claim 23, further comprising pipe moving means for moving said hollow pipe into and out of said at least one well so that said array of openings may be positioned at various heights along said well.

25. The apparatus of claim 16 or 19, further comprising concentration monitoring means for monitoring the concentration of contaminant vapor in at least one of said air removed from said first well and air leaving said removing means.

26. The apparatus of claim 16 or 19, wherein said removing means is a vacuum blower, said vacuum blower having an input connected to draw air from said first well.

27. The apparatus of claim 26, wherein an output of said vacuum blower forces air into said second well.

28. The apparatus of claim 19, wherein said heat source is disposed along said conduit.

29. The apparatus of claim 28, wherein said heat source is between said air removing means and said second well.

30. A method for removing a volatile contaminant from portions of ground between a surface and ground water level comprising the steps of:
  removing air and vapor of said volatile contaminant from a first well extending into contaminated ground;
  condensing at least a portion of vapors of the contaminant from the air drawn from said first well,
  recirculating the air from which at least a portion of the contaminant has been removed into second well; and
  heating the air to be recirculated into said second well with heat removed from said air from said first well by said step of condensing.

31. The method of claim 30, wherein a heat pump is connected to remove heat form air drawn from said first well and to heat air allowed into said second well.

32. A method for removing a volatile contaminant from portions of ground contaminated with said contaminant, comprising the steps of:
  removing air and vapor of said volatile contaminant from a first well extending into said contaminated ground while air enters a second well substantially parallel to said first well;
  condensing vapors of the contaminant from the air drawn from said first well; and
  using a heat pump to heat air allowed into said second well with heat removed from air drawn from said first well.

33. A method for removing a volatile contaminant from portions of ground contaminated with said contaminant and having drilled therein at least two substantially parallel wells extending downward into the ground, comprising the steps of:
  (a) inserting into at least a first of said wells and a second of said wells a pipe having an outer diameter such that it fits tightly into said well, said pipe having a continuous wall without openings along a substantial portion of its length, a closed bottom, and an array of openings along a limited portion of its length;
  (b) adjusting depth of the arrays of openings of said first pipe and said second pipe to a lowest level of said contaminant above ground water and so that the depths of said arrays are substantially equal;
  (c) circulating air between said first pipe and said second pipe to purge the ground of the volatile contaminant;
  (d) adjusting depth of said arrays of opening to a second level, and repeating step (c).

34. An apparatus for removing a volatile contaminant from portions of ground contaminated with said contaminant comprising:
  a first well extending down into the ground;
  a second well in proximity to said first well and arranged substantially in parallel with said first well;
  air removing means for removing air and vapor of said contaminant from said first well;
  contaminant removing means for removing contaminant contained in said air removed from said first well;
  a hollow pipe fitting tightly in at least one of said first well and said second well, said pipe having a continuous wall without openings along a substantial portion of its length; and an array of openings along a limited portion of its length; and
  pipe moving means for moving said hollow pipe into and out of said at least one well so that said array of openings may be positioned at various heights along said at least one well.

* * * * *